US009458755B2

(12) United States Patent
Aeffner

(10) Patent No.: US 9,458,755 B2
(45) Date of Patent: Oct. 4, 2016

(54) RADIANT HEAT DISCHARGE ARRANGEMENT

(71) Applicant: Caterpillar Motoren GmbH & Co. KG, Kiel (DE)

(72) Inventor: Kurt Aeffner, Altenholz (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 21 days.

(21) Appl. No.: 14/398,048

(22) PCT Filed: May 10, 2013

(86) PCT No.: PCT/EP2013/001392
§ 371 (c)(1),
(2) Date: Oct. 30, 2014

(87) PCT Pub. No.: WO2013/167281
PCT Pub. Date: Nov. 14, 2013

(65) Prior Publication Data
US 2015/0121858 A1    May 7, 2015

(30) Foreign Application Priority Data

May 11, 2012  (EP) .................................... 12167643

(51) Int. Cl.
*F01N 3/02*    (2006.01)
*F01N 13/14*   (2010.01)
(Continued)

(52) U.S. Cl.
CPC ............... *F01N 13/14* (2013.01); *F01N 3/02* (2013.01); *F01N 3/055* (2013.01); *F01N 13/102* (2013.01); *F01N 5/02* (2013.01); *F01N 2260/20* (2013.01); *Y02T 10/20* (2013.01)

(58) Field of Classification Search
CPC .......... F01N 3/055; F01N 13/14; F01N 3/02; F01N 2260/20; Y02T 10/20
USPC ............................................................ 60/321
See application file for complete search history.

(56) References Cited

U.S. PATENT DOCUMENTS 3,201,934 A    8/1965  Smith
3,964,462 A *  6/1976  Thien ...................... F02B 77/13
                                              123/198 E
(Continued)

FOREIGN PATENT DOCUMENTS

DE        4243593 A1    7/1993
DE       10331938 A1    3/2005
(Continued)

OTHER PUBLICATIONS

International Search Report mailed Aug. 7, 2013, in Application No. PCT/EP2013/001392 (3 pages).
(Continued)

*Primary Examiner* — Jason Shanske
(74) *Attorney, Agent, or Firm* — Finnegan, Henderson, Farabow, Garrett & Dunner, LLP

(57) ABSTRACT

A radiant heat discharge arrangement for use with a internal combustion engine is disclosed. The internal combustion engine may have an outlet manifold. The radiant heat discharge arrangement may have a cover configured to over the outlet manifold with a clearance between the cover and the outlet manifold. The cover may have at least one outlet opening. The radiant heat discharge arrangement may also have an air duct having at least one air inlet fluidly connected to the at least one outlet opening of the cover. The air duct may also have an air outlet. Further, the radiant heat discharge arrangement may have a fan fluidly connected to the air outlet.

19 Claims, 2 Drawing Sheets

(51) Int. Cl.
*F01N 3/05* (2006.01)
*F01N 13/10* (2010.01)
*F01N 5/02* (2006.01)

(56) References Cited

U.S. PATENT DOCUMENTS

| | | |
|---|---|---|
| 4,218,211 A | 8/1980 | Caplan |
| 4,560,349 A | 12/1985 | Vider |
| 4,998,510 A * | 3/1991 | Rognon ............... F01N 3/043 123/41.57 |
| 5,284,115 A | 2/1994 | Imanishi et al. |
| 5,934,073 A | 8/1999 | Gieshoff et al. |
| 6,330,910 B1 | 12/2001 | Bennett |
| 7,654,312 B2 | 2/2010 | Beauerle et al. |
| 7,823,798 B2 | 11/2010 | Le Lievre |
| 2007/0012000 A1* | 1/2007 | Maas ................ B60K 13/02 55/385.3 |
| 2009/0188734 A1 | 7/2009 | Braun et al. |
| 2009/0255243 A1 | 10/2009 | Raab et al. |
| 2010/0230506 A1 | 9/2010 | Henriksson |
| 2010/0251703 A1 | 10/2010 | Takeishi et al. |

FOREIGN PATENT DOCUMENTS

| | | |
|---|---|---|
| EP | 0345144 A1 | 12/1989 |
| EP | 2192281 A1 | 6/2010 |
| EP | 2387869 A1 | 11/2011 |
| JP | 54-037713 U | 3/1979 |
| JP | 57-198986 U | 12/1982 |
| JP | 59-035634 U | 3/1984 |

OTHER PUBLICATIONS

European Search Report dated Oct. 16, 2012 in European Application No. 12167643 (2 pages).

* cited by examiner

RADIANT HEAT DISCHARGE ARRANGEMENT

CLAIM FOR PRIORITY

This application is a U.S. National Phase entry under 35 U.S.C. §371 from PCT International Application No. PCT/EP2013/001392, filed May 10, 2013, which claims benefit of priority of European Patent Application No. 12167643.1, filed May 11, 2012, all of which are incorporated herein by reference.

TECHNICAL FIELD

The present disclosure generally refers to cooling systems for combustion engines and more particularly to cooling systems for large internal combustion engines for marine ships, power plants or offshore applications.

BACKGROUND

During operation of internal combustion engines, considerable amounts of heat are generated by burning of a fuel in a combustion unit of the engine. The heat is transmitted to the outer surfaces of the combustion unit. Thus, those outer surfaces increase their temperatures. Similarly, hot exhaust gas heats the exhaust gas system. For example, an exhaust gas outlet manifold may be heated by hot exhaust gas leaving the combustion unit.

Hot surfaces may entail the risk of autoignition of finely dispersed fuel and/or oil spreading over the hot surfaces. Spontaneous autoignition may result in fatal deflagration, that may harm human beings and may cause oil and fuel leakages that may lead to engine room fires. Moreover, hot surfaces pose a serious danger of skin burns.

According to IACS, DNV and SOLAS rules, engine surfaces exceeding a surface temperature of 220° C. have to be insulated.

For example, it is well known to insulate an exhaust gas outlet manifold of an internal combustion engine to undercut the regulatory maximum surface temperature of 220° C. However, common insulations for exhaust gas outlet manifolds suffer of high costs.

Furthermore, surface insulations may lead to heat accumulation within the engine, which may negatively affect engine parts. For example, it is known that, in particular for V-type engines, heat accumulation may lead to crankshaft deflection.

Still further, an engine room, wherein at least one engine may be set, may heat up and, thus, additional engine room ventilation may be required. Otherwise, technicians working in the engine room may suffer of high room temperatures.

Examples of engine cooling devices are disclosed in JP 54 0377713 U, JP 59 035634 U, U.S. Pat. No. 5,284,115 A, EP 2 192 281 A1 and EP 0 345 144 A1.

The present disclosure is directed, at least in part, to improving or overcoming one or more aspects of prior systems.

SUMMARY OF THE DISCLOSURE

According to an aspect of the present disclosure, a radiant heat discharge arrangement may be configured to be used at a large internal combustion engine including an outlet manifold. The radiant heat discharge arrangement may comprise a cover configured to be mounted on the large internal combustion engine and to cover the outlet manifold of the internal combustion engine with a clearance between the cover and the outlet manifold, the cover having at least one outlet opening and comprising a circumferential lower edge, which is shaped such that at least some parts of the circumferential lower edge define an inlet air gap against the large internal combustion engine, an air duct having at least one air inlet fluidly connected to the at least one outlet opening of the cover and an air outlet, and a fan fluidly connected to the air outlet.

According to another aspect of the present disclosure, a radiant heat discharge arrangement may be configured to be used at large internal combustion engine that may include an outlet manifold. The radiant heat discharge arrangement may comprise a cover that may be configured to cover the outlet manifold of the internal combustion engine with a clearance between the cover and the outlet manifold. The cover may have at least one outlet opening. The radiant head discharge arrangement may further comprise an air duct that may have an air outlet and at least one air inlet that may be fluidly connected to the at least one outlet opening of the cover. The radiant heat discharge arrangement may further comprise a fan that may be fluidly connected to the air outlet.

According to another aspect of the present disclosure, a large internal combustion engine may comprise a radiant heat discharge arrangement and a funnel. The funnel may be fluidly connected downstream to the radiant heat discharge arrangement.

According to yet another aspect of the present disclosure, a power plant may comprise an engine room and at least one large internal combustion engine that may be arranged in the engine room. The at least one large internal combustion engine may comprise the radiant heat discharge arrangement.

According to yet another aspect of the present disclosure, a method for radiant heat discharge of a large internal combustion engine may comprise operating the large internal combustion engine comprising an outlet manifold, collecting heated ambient air below a cover arranged with a clearance to the outlet manifold, the cover being configured to be mounted on the large internal combustion engine and comprising a circumferential lower edge, which is shaped such that at least some parts of the circumferential lower edge define an inlet air gap against the large internal combustion engine, and removing the heated ambient air from the space between the cover and the outlet manifold through at least one outlet opening in the cover.

According to yet another aspect of the present disclosure, a method for radiant heat discharge of a large internal combustion engine may comprise operating the large internal combustion engine. The large internal combustion engine may comprise an outlet manifold. The method may further comprise collecting heated ambient air below a cover that may be arranged with a clearance to the outlet manifold. The method may further comprise removing the heated ambient air from the space between the cover and the outlet manifold through at least one outlet opening in the cover.

Other features and aspects of this disclosure will be apparent from the following description and the accompanying drawings.

DETAILED DESCRIPTION

Figure 1:
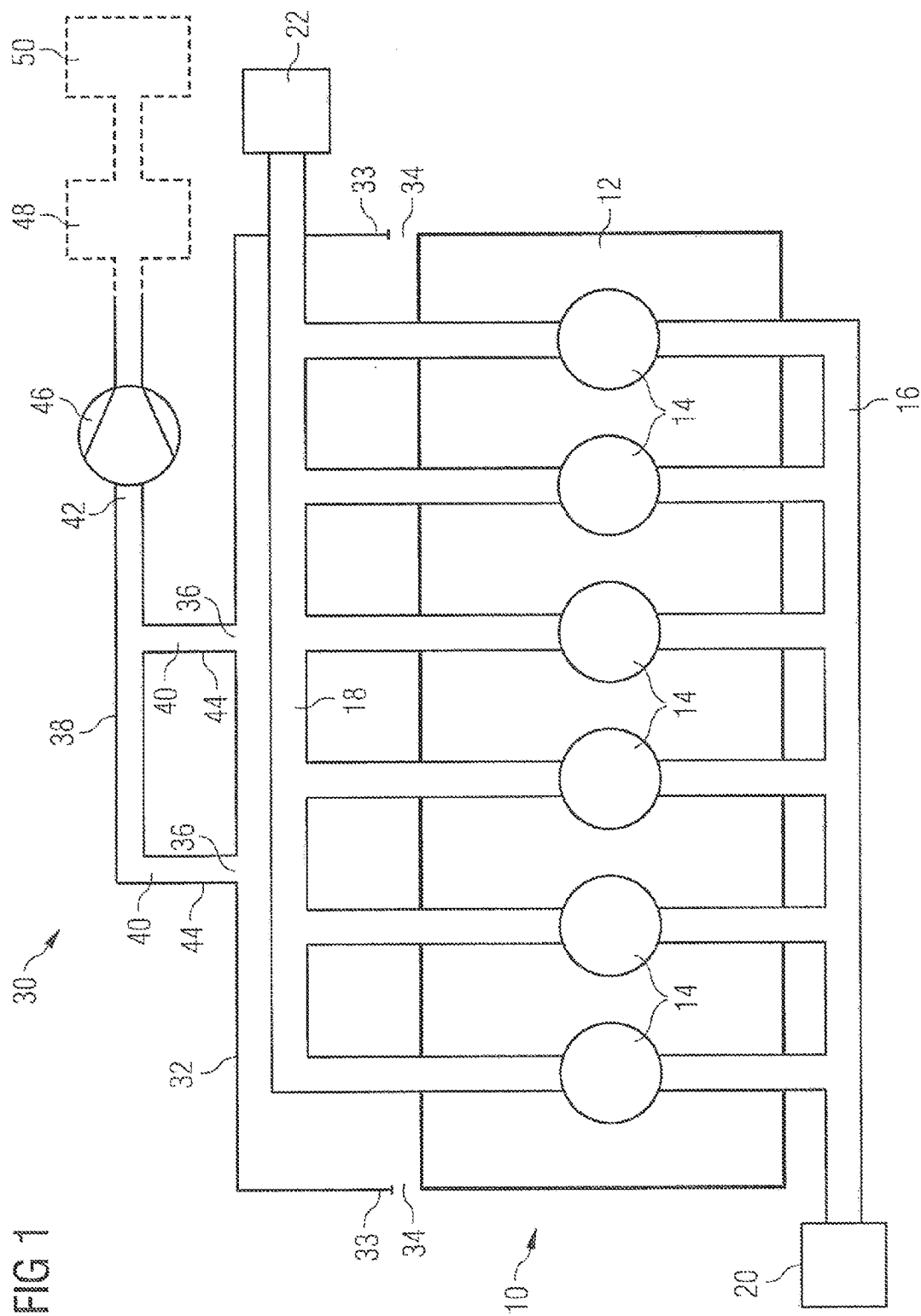
FIG. 1 shows a schematic diagram of an internal combustion engine with a cover covering an outlet manifold.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that an insulation of an outlet manifold of an internal combustion engine may be not cost efficient and may have various side effects. For example, heat accumulation within the engine, may lead to crankshaft deflection by thermal expansion of the engine block, and the engine room may heat up and may require increased engine room ventilation.

Accordingly, it is proposed to cool the hot surfaces of the outlet manifold by providing a radiant heat discharge arrangement in a cost effective manner to reliably reduce heat accumulation within the engine, and/or heating of the engine room.

Figure 2:
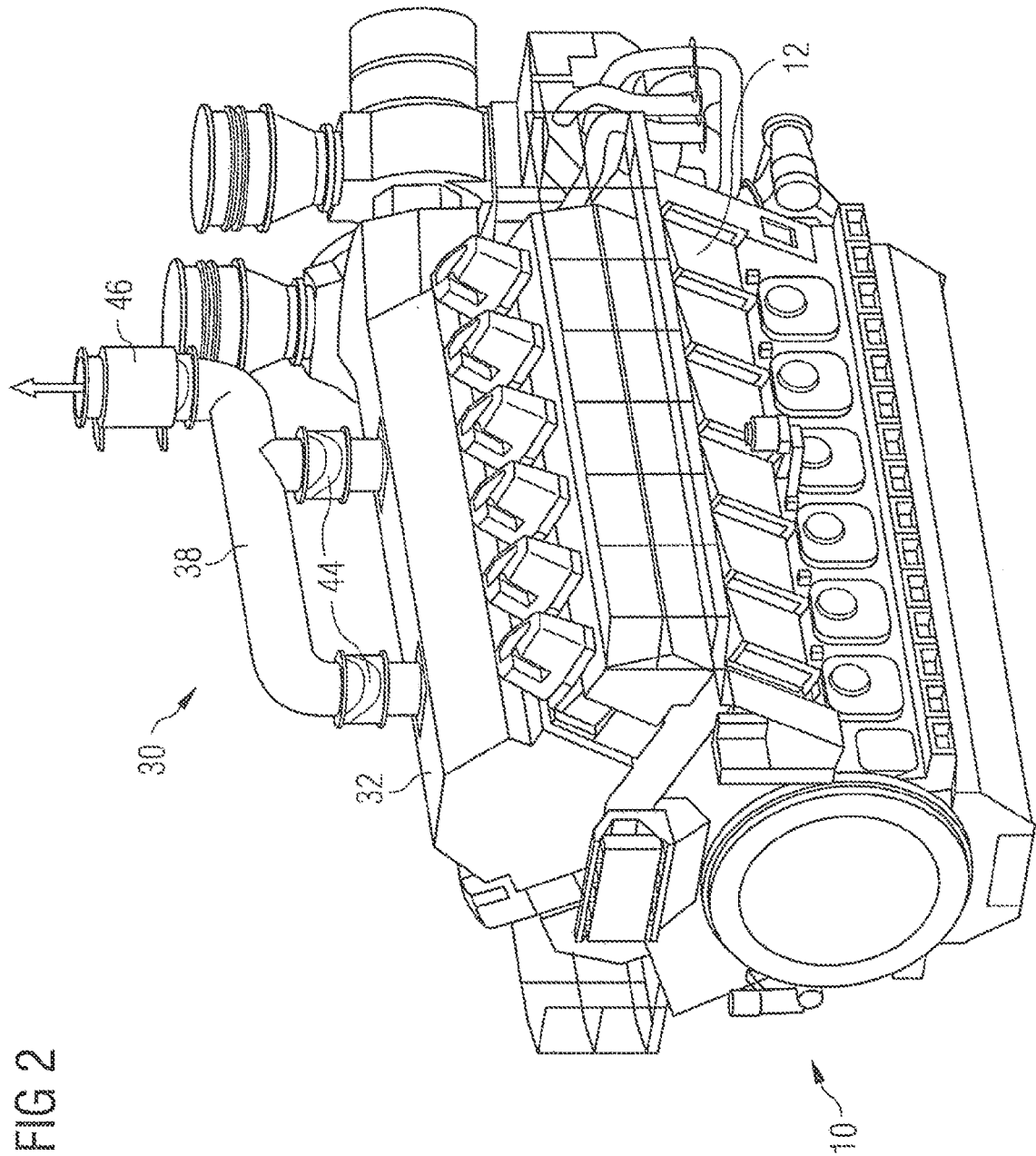
FIG. 2 shows a schematic drawing of an internal combustion engine with a cover covering an outlet manifold.

An exemplary embodiment of a radiant heat discharge arrangement comprising a cover, an air duct and a fan is described in the following with reference to FIG. 1 and FIG. 2.

An internal combustion engine 10 may comprise a combustion unit 12 with one or more cylinders and associated combustion chambers 14, and a radiant heat discharge arrangement 30.

Combustion unit 12 may be, for example, a diesel, heavy fuel, crude oil, and/or gas powered combustion unit. The cylinders may be arranged, for example, in an in-line, V, W, or any other known configuration.

Combustion unit 12 may further comprise an intake manifold 16. Intake manifold 16 may be connected to charge air system 20. Charge air system 20 may comprise one or more stages of a charge air system.

Combustion unit 12 may further comprise outlet manifold 18. Outlet manifold 18 may be connected to exhaust gas system 20. Exhaust gas system 20 may comprise exhaust gas treatment devices, such as catalysts and filters, and/or exhaust gas turbines that may be drivingly coupled to compressors of a charge air system 20.

Radiant heat discharge arrangement 30 may comprise cover 32. Cover 32 may cover outlet manifold 18 of large internal combustion engine 10 with a clearance between cover 32 and outlet manifold 18 such that a hollow space is defined.

Cover 32 may further comprise at least one outlet opening 36.

In some embodiments, the cover 32 may comprise a circumferential lower edge 33. Circumferential lower edge 33 may be shaped such that at least some parts of circumferential lower edge 33 may define an inlet air gap 34 against internal combustion engine 10.

In some embodiments, cover 32 may be configured and structured to cover outlet manifold 18 of large internal combustion engine 10 from one side only. Cover 32 may be mounted on large internal combustion engine 10.

Air duct 38 may comprise at least one air duct inlet 40, and an air duct outlet 42. The at least one air duct inlet 40 may be fluidly connected to the at least one outlet opening 36 of cover 32.

In some embodiments, the at least one outlet opening 36 may be configured as engaging member to transport cover 32. For example, a region around outlet openings 36 may be reinforced with reinforcement fins or bars.

In some embodiments, the at least one outlet opening 36 may be configured to insert engaging members for transportation of large internal combustion engine 10 in an assembly state in which not yet air duct 38 is connected to the at least one outlet opening 36. Said engaging members engage with respective engaging counterparts of large internal combustion engine 10 and can be accessed through the at least one outlet opening 36 for connecting, for example, to a transport chain which in turn is connected to a crane.

In some embodiments, at least one sub air duct 44 may fluidly interconnect the at least one outlet opening 36 of cover 32 and the at least one air duct inlet 40 of air duct 38.

Fan 46 may be fluidly connected to air duct outlet 42 of air duct 38.

In some embodiments, heat exchanger 48 may be fluidly connected to fan 46. Heat exchanger 48 may further be connected to a heat demanding or heat recovery system.

In some embodiments, the heat demanding system may be, for example, a swimming pool or a radiator.

In some embodiments, funnel 50 may be fluidly connected downstream to heat exchanger 48, and/or fan 46.

In some embodiments, cover 32 may further comprise a plurality of inlet air openings configured to guide air from outside cover 32 to the space below cover 32 which may be heated below cover 32 and guided out of cover 32 via fan 46. For example, said inlet openings may be arranged in a section of a lower circumferential region around of cover 32.

INDUSTRIAL APPLICABILITY

In the following, the basic operation of the above exemplary embodiment of internal combustion engine is described with reference to FIG. 1.

During normal operation of large internal combustion engine 10, fuel and combustion air may be supplied to and burned in combustion unit 12. Combustion air may be compressed by one or more stages of a charge air system 20 prior charging to combustion chambers 14 of combustion unit 12.

After combustion, hot exhaust gas may leave combustion unit 12 of large internal combustion engine 10 through outlet manifold 18 to exhaust gas system 22.

Exhaust gas passing outlet manifold 18 may be very hot, for example, 500° C. or even higher temperatures. Outlet manifold 18 may transfer heat from hot exhaust gas to its outer surface. The outer surface of outlet manifold 18 may transfer heat to surrounding ambient air that may be located in the clearance between outlet manifold 18 and cover 32.

Fan 46 may convey heated ambient air located in the clearance between outlet manifold 18 and cover 32 through at least one outlet opening 36 of cover 32. Heated ambient air may be conveyed away from outlet manifold 18 through air duct 38.

Simultaneously, cool ambient air may be sucked in by fan 46 through inlet air gap 34. Inflowing ambient air may have a temperature below an outer surface temperature of outlet manifold 18, and may transfer the radiation heat of outlet manifold 18 by air flow.

In some embodiments, fan 46 may convey heated ambient air to a heat exchanger 48. Heat exchanger 48 may transfer heat from heated ambient air originating from below cover 32 to a heat demanding system. For example, a heat demanding system may be a radiator.

In some embodiments, fan 46 may convey heated ambient air from below cover 32 through a funnel 50 to the environment. For example, funnel 50 may be arranged outside an engine room, wherein at least one large internal combustion engine 10 comprising radiant heat discharge arrangement 30 may be operated. Such an engine room may be located in a ship, a power plant, or an oil rig.

In the following a method for radiant heat discharge of a large internal combustion engine is described.

A large internal combustion engine 30 may be operated. During operation, hot exhaust gas may leave combustion unit 12 through outlet manifold 18, and may heat up outlet manifold 18 while passing the same.

Ambient air may be collected below a cover 32 arranged with a clearance to the outlet manifold 18. Ambient air may heat up by heat transfer from the heated outlet manifold 18.

Heated ambient air from the space between cover 32 and outlet manifold 18 may be removed. Heated ambient air may be removed through at least one opening 36 in cover 32.

Moreover, heated ambient air cool from the space between cover 32 and outlet manifold 18 may be replaced by cool ambient air may. Cool ambient air may inflow to the space between cover 32 and outlet manifold 18 through at least on inlet air gap 34.

In some embodiments, heated ambient air from the space between cover 32 and outlet manifold 18 may be conveyed to heat exchanger 48 to may be transfer heat of heated ambient air to a heat demanding system.

In some embodiments, heated ambient air from the space between cover 32 and outlet manifold 18 may be released to the environment after, or instead of heat transfer. This may be done, for example, through funnel 50.

Generally, the terminology "internal combustion engine" as used herein is not specifically restricted and comprises any engine, in which the combustion of a fuel occurs with an oxidizer to produce high temperature and pressure gases, which may be directly applied to a movable component of the engine, such as pistons or turbine blades, and move it over a distance thereby generating mechanical energy. Thus, as used herein, the term "internal combustion engine" comprises piston engines and turbines.

Herein, the term "large internal combustion engine" may refer to internal combustion engines which may be used as main or auxiliary engines of stationary power providing systems such as power plants for production of heat and/or electricity as well as in ships/vessels such as cruiser liners, cargo ships, container ships, and tankers. Fuels for internal combustion engines may include diesel oil, marine diesel oil, heavy fuel oil, alternative fuels or a mixture thereof, and natural gas. The engine may comprise up to 20 cylinders and may have a power output of more than 500 KW/cylinder. The engine may radiate heat in a range of 100 kW for smaller engines up to 700 kW for larger engines with up to 20 cylinders. For example, a 12 cylinder V-line engine may have a power output of 12000 kW and radiate heat in the range of 500 kW.

Although the preferred embodiments of this invention have been described herein, improvements and modifications may be incorporated without departing from the scope of the following claims.

The invention claimed is:

1. A radiant heat discharge arrangement configured to be used with an internal combustion engine including an outlet manifold, the radiant heat discharge arrangement comprising:
   a cover configured to cover the outlet manifold of the internal combustion engine with a clearance between the cover and the outlet manifold, the cover including:
      at least one outlet opening; and
      a circumferential lower edge being shaped to define an inlet air gap between at least a portion of the circumferential lower edge and the internal combustion engine, the inlet air gap being configured to allow air to enter the clearance from an ambient;
   an air duct having at least one air inlet fluidly connected to the at least one outlet opening of the cover and an air outlet; and
   a fan fluidly connected to the air outlet.

2. The radiant heat discharge arrangement according to claim 1, further comprising a heat exchanger fluidly connected to the fan.

3. The radiant heat discharge arrangement according to claim 1, wherein the cover is made of steel sheet.

4. The radiant heat discharge arrangement according to claim 1, wherein the at least one outlet opening of the cover is configured as an engaging member for transportation of the cover.

5. The radiant heat discharge arrangement according to claim 1, wherein the cover is mounted on the internal combustion engine and the at least one outlet opening of the cover is configured to insert a chain connected to a crane.

6. The radiant heat discharge arrangement according to claim 1, further comprising at least one sub air duct fluidly interconnected between the at least one outlet opening of the cover and the at least one air inlet of the air duct.

7. The radiant heat discharge arrangement according to claim 1, wherein the internal combustion engine is one of a diesel, heavy fuel, crude oil, or dual fuel internal combustion engine for one of a marine ship, a power plant, or an offshore application.

8. A power plant, comprising:
   an engine room;
   at least one internal combustion engine arranged in the engine room, wherein the at least one internal combustion engine comprises the radiant heat discharge arrangement according to claim 1; and
   a funnel fluidly connected to the radiant heat discharge arrangement, the funnel being disposed downstream of the radiant heat discharge arrangement.

9. An internal combustion engine, comprising:
   at least one combustion chamber;
   an intake manifold configured to charge the at least one combustion chamber with air;
   an outlet manifold configured to discharge exhaust gas from the combustion chamber to an atmosphere;
   a radiant heat discharge arrangement, including:
      a cover disposed above the outlet manifold with a clearance between the cover and the outlet manifold, the cover including:
         at least one outlet opening in the cover; and
         a circumferential lower edge being shaped to define an inlet air gap between at least a portion of the circumferential lower edge and the internal combustion engine, the inlet air gap being configured to allow air to enter the clearance from an ambient;

an air duct having at least one air inlet and an air outlet, the at least one air inlet being fluidly connected to the at least one outlet opening; and
a fan fluidly connected to the air outlet.

10. The internal combustion engine according to claim 9, wherein the cover includes a circumferential lower edge shaped to define an inlet air gap between at least some parts of the circumferential lower edge and the internal combustion engine.

11. The internal combustion engine according to claim 9, further including a heat exchanger fluidly connected to the fan.

12. The internal combustion engine according to claim 11, further including a funnel fluidly connected to the heat exchanger.

13. The internal combustion engine according to claim 12, wherein
the fan is configured to remove air heated by the outlet manifold from the cover and discharge the air to the heat exchanger,
the heat exchanger is configured to cool the air and discharge the air to the funnel, and
the funnel is configured to discharge the air into the atmosphere.

14. The internal combustion engine according to claim 9, wherein the radiant heat discharge arrangement further includes at least one sub air duct fluidly interconnected between the at least one outlet opening of the cover and the at least one air inlet of the air duct.

15. The internal combustion engine according to claim 9, wherein the cover is made of steel sheet.

16. A method for radiant heat discharge from an internal combustion engine, comprising:
operating the internal combustion engine comprising an outlet manifold;
collecting heated ambient air below a cover arranged to provide a clearance between the cover and the outlet manifold, the cover being configured to be mounted on the internal combustion engine and comprising a circumferential lower edge, which is shaped to define an inlet air gap between at least some parts of the circumferential lower edge and the internal combustion engine;
receiving cool ambient air from the inlet air gap into the clearance; and
removing the heated ambient air from the clearance between the cover and the outlet manifold through at least one outlet opening in the cover.

17. A method for radiant heat discharge of an internal combustion engine, comprising:
operating the internal combustion engine comprising an outlet manifold;
collecting heated ambient air below a cover arranged to provide a clearance between the cover and the outlet manifold;
receiving cool ambient air from an inlet air gap between the cover and the internal combustion engine into the clearance; and
removing the heated ambient air from a space between the cover and the outlet manifold through at least one outlet opening in the cover.

18. The method for radiant heat discharge according to claim 17, further comprising:
conveying the heated ambient air to a heat exchanger; and
transferring the heat of the heated ambient air to a heat demanding system.

19. The method for radiant heat discharge according to claim 17, further comprising conveying the ambient air to the environment.

* * * * *